(12) United States Patent
Sugimoto et al.

(10) Patent No.: US 8,300,241 B2
(45) Date of Patent: Oct. 30, 2012

(54) IMAGE READING DEVICE AND CONTROL METHOD THEREOF

(75) Inventors: Hideaki Sugimoto, Saitama (JP); Satoshi Okochi, Saitama (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1514 days.

(21) Appl. No.: 11/438,274

(22) Filed: May 23, 2006

(65) Prior Publication Data

US 2007/0121148 A1 May 31, 2007

(30) Foreign Application Priority Data

Nov. 25, 2005 (JP) ................................. 2005-340564

(51) Int. Cl.
G06K 15/00 (2006.01)
G06F 3/12 (2006.01)

(52) U.S. Cl. ...................... 358/1.14; 358/1.13; 358/1.15; 358/1.16

(58) Field of Classification Search ......... 358/1.13–1.16
See application file for complete search history.

(56) References Cited

U.S. PATENT DOCUMENTS

| | | | | |
|---|---|---|---|---|
| 5,513,126 A * | 4/1996 | Harkins et al. | ................ | 709/228 |
| 6,069,706 A * | 5/2000 | Kajita et al. | ................ | 358/1.15 |
| 6,115,739 A * | 9/2000 | Ogawa et al. | ................ | 709/215 |
| 6,167,462 A * | 12/2000 | Davis et al. | ................ | 710/5 |
| 6,266,162 B1 * | 7/2001 | Okamura et al. | ............. | 358/468 |
| 6,330,068 B1 * | 12/2001 | Matsuyama | ................ | 358/1.14 |
| 6,469,797 B2 * | 10/2002 | Sakai | ................ | 358/1.15 |
| 7,024,486 B2 * | 4/2006 | Itoh | ................ | 709/238 |
| 7,123,371 B1 * | 10/2006 | Yoda et al. | ................ | 358/1.15 |
| 7,167,258 B2 * | 1/2007 | Yamamoto | ................ | 358/1.15 |
| 7,304,759 B2 * | 12/2007 | Kiyono et al. | ............... | 358/1.15 |
| 7,327,478 B2 * | 2/2008 | Matsuda | ................ | 358/1.14 |
| 7,330,280 B2 * | 2/2008 | Kanazawa | ................ | 358/1.13 |
| 7,417,756 B2 * | 8/2008 | Yamamoto | ................ | 358/1.15 |
| 7,434,161 B2 * | 10/2008 | Todaka et al. | ................ | 715/255 |
| 7,460,736 B2 * | 12/2008 | Iinuma et al. | ................ | 382/305 |
| 7,480,069 B2 * | 1/2009 | Yoshida et al. | ............... | 358/1.16 |
| 7,519,302 B2 * | 4/2009 | Matsuhara | ................ | 399/8 |
| 7,529,863 B2 * | 5/2009 | MacKay et al. | ................ | 710/15 |
| 7,545,524 B2 * | 6/2009 | Seo | ................ | 358/1.14 |
| 7,557,941 B2 * | 7/2009 | Walmsley | ................ | 358/1.14 |

(Continued)

FOREIGN PATENT DOCUMENTS

JP 01-099364 4/1989

(Continued)

OTHER PUBLICATIONS

Office Action issued in JP Application No. 2005-340564 on Oct. 19, 2010 (with English translation).

(Continued)

*Primary Examiner* — Twyler Haskins
*Assistant Examiner* — Jonathan Beckley
(74) *Attorney, Agent, or Firm* — Oliff & Berridge, PLC (57) ABSTRACT

An image reading device which performs an original reading processing in a push scan mode in which image data read from an original document is output to an output destination terminal through a network, and which includes a judging unit that judges whether or not the image data can be output to the output destination terminal, and an image reading unit that cancels the original reading operation when it is judged by the judging unit that the output is impossible.

9 Claims, 6 Drawing Sheets

U.S. PATENT DOCUMENTS

| | | | |
|---|---|---|---|
| 2003/0048303 A1* | 3/2003 | Mesa et al. | 345/771 |
| 2003/0184787 A1* | 10/2003 | Kuroda et al. | 358/1.13 |
| 2005/0174606 A1* | 8/2005 | Matsueda et al. | 358/402 |
| 2005/0195446 A1* | 9/2005 | Kasatani | 358/402 |
| 2005/0286080 A1* | 12/2005 | Lee et al. | 358/1.15 |
| 2006/0044585 A1* | 3/2006 | Kaneko | 358/1.13 |
| 2006/0044609 A1* | 3/2006 | Kato et al. | 358/1.15 |
| 2006/0256392 A1* | 11/2006 | Van Hoof et al. | 358/402 |
| 2006/0271675 A1 | 11/2006 | Wakazono et al. | |

FOREIGN PATENT DOCUMENTS

| | | |
|---|---|---|
| JP | 06-019847 | 1/1994 |
| JP | 10-070629 | 3/1998 |
| JP | 11-146109 | 5/1999 |
| JP | A 11-127298 | 5/1999 |
| JP | 2938715 | 6/1999 |
| JP | 2000-092121 | 3/2000 |
| JP | 2000-295398 | 10/2000 |
| JP | A-2003-162471 | 6/2003 |
| JP | 2003-348278 | 12/2003 |
| JP | 2004-104671 | 4/2004 |
| JP | A-2004-120003 | 4/2004 |
| JP | 2004-172760 | 6/2004 |
| JP | 2004-215009 | 7/2004 |
| JP | A-2004-304322 | 10/2004 |
| JP | 2005-094444 | 4/2005 |
| JP | A-2005-167357 | 6/2005 |
| JP | 2005-192022 | 7/2005 |
| JP | 2005-300605 | 10/2005 |
| JP | 2006-339904 | 12/2006 |

OTHER PUBLICATIONS

Office Action issued in JP Application No. 2005-340564 on Jan. 11, 2011 (with English translation).

Office Action issued in JP Application No. 2005-340564 on Jul. 27, 2010 (with English translation).

* cited by examiner

IMAGE READING DEVICE AND CONTROL METHOD THEREOF

BACKGROUND

1. Technical Field

The present invention relates to an image reading device and a control method thereof which perform an original reading process in a push scan mode that outputs image data read from an original document to an output destination terminal on a network, and more particularly to an image reading device and a control method thereof which cancel an original reading operation if image data cannot be output to an output destination terminal.

2. Related Art

Generally, offices (companies, government and other public offices), schools and the like are provided with a network system in order to use a scanner (image reading device) commonly by a plurality of users.

The scanner which operates in connection with the network is called a network scanner and reads image data from an original document under control of a plurality of computers which are similarly connected to the network.

In a case where this type of network scanner is used to read an original document, its operation mode includes a pull scan mode and a push scan mode. In the pull scan mode, the scanner is controlled to read the original document by operating from the computer as described above, and in the push scan mode, the operation panel on the scanner is operated to read the original document by the scanner.

In other words, the scanner in the pull scan mode is operated under control of the computer, and the scanner in the push scan mode is operated under control of the scanner body.

To read the original document in the latter push scan mode, it is necessary to previously register an output destination (e.g., a computer or the like on the network) where the read image data is output, and the scanner outputs the image data at the registered output destination.

For example, where the output destination is a computer, the read image data is output to and also stored in a storage device on the computer, but where the output destination is a printer, printing is made by the printer according to the read image data. If the scanner has a storage device such as a hard disk therein, the output destination may be the storage device provided therein, but it is general that the network scanner has a computer, a printer or the like on the network as the output destination.

Conventionally, the scanner processes in order of accumulation of all the read image data, authentication of them, and transfer of data. It has an advantage that the reading can be completed without depending on the state of the destination computer, but if the authentication fails because of an invalid login name/password, down of the computer or the like, such an abnormality is notified after the original reading process has been completed.

Therefore, the user tends to misunderstand that the job has been done properly even if a failure has occurred. Especially, in a case where a scanner having an auto document feeder (ADF) is used to scan continuously irrespective of the situation of a transfer destination, the auto document feeder operates, and the user sees the actual reading operation. Thus, it results in further misleading the user.

SUMMARY

An aspect of the present invention provides an image reading device which performs an original reading process in a push scan mode in which image data read from an original document is output to an output destination terminal through a network, including: a judging unit that judges whether or not the image data can be output to the output destination terminal; and an image reading unit that cancels the original reading operation when it is judged by the judging unit that the output is impossible.

BRIEF DESCRIPTION OF THE DRAWINGS

Embodiments of the present invention will be described in detail based on the following figures, wherein.

DETAILED DESCRIPTION

Embodiments of an image reading device and a control method thereof according to the present invention will be described in detail with reference to the accompanying figures.

Exemplary Embodiment

Figure 1:
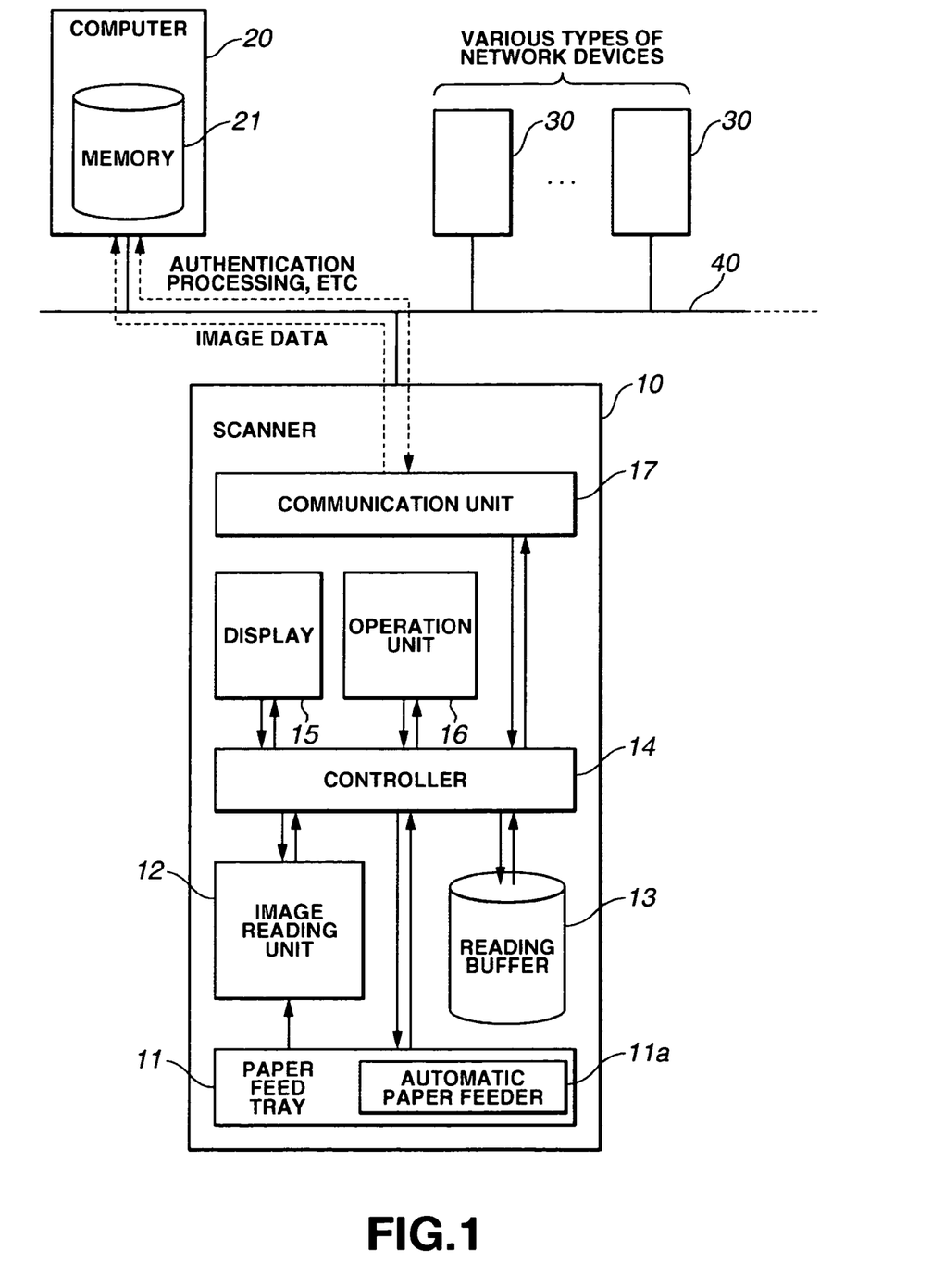
FIG. 1 is a diagram showing an example of the entire structure of a network system configured with the image reading device (scanner) of the invention disposed.

FIG. 1 is a diagram showing an exemplary embodiment of the entire structure of a network system configured with the image reading device of the invention disposed. This embodiment describes a case where the image reading device according to the invention is applied to the scanner 10.

This network system is comprised of the scanner 10 which reads image data from an original document and a computer 20 which receives the image data read by the scanner 10 and stores it. The scanner 10 and the computer 20 are connected to be communicable mutually through a network 40 such as an LAN (Local Area Network). On the network 40 are appropriately disposed various types of network devices 30 such as a printer, a facsimile, etc. which operate in connection with the network.

The computer 20 has therein a memory 21 which is configured of a hard disk or the like for storing various types of data, and the memory 21 mainly accumulates image data read by the scanner 10. In other words, the computer 20 functions as a data storage for storing the image data read by the scanner 10.

The scanner 10 reads a figure, a photograph or characters from an original document which is placed on a platen glass or being moved on the platen glass by scanning and converts into digital data (image data).

The scanner 10 has a pull scan mode to operate under control of a computer and a push scan mode to operate under control of the scanner body and reads the original document in either of the operation modes. In this embodiment, it is assumed that the scanner 10 operates in the push scan mode, and the computer 20 is determined as an output destination of the image data read from the original document.

For example, the output destination of the image data can be determined from an operation panel (a display 15, an operation unit 16) disposed on the scanner 10.

Figure 2:
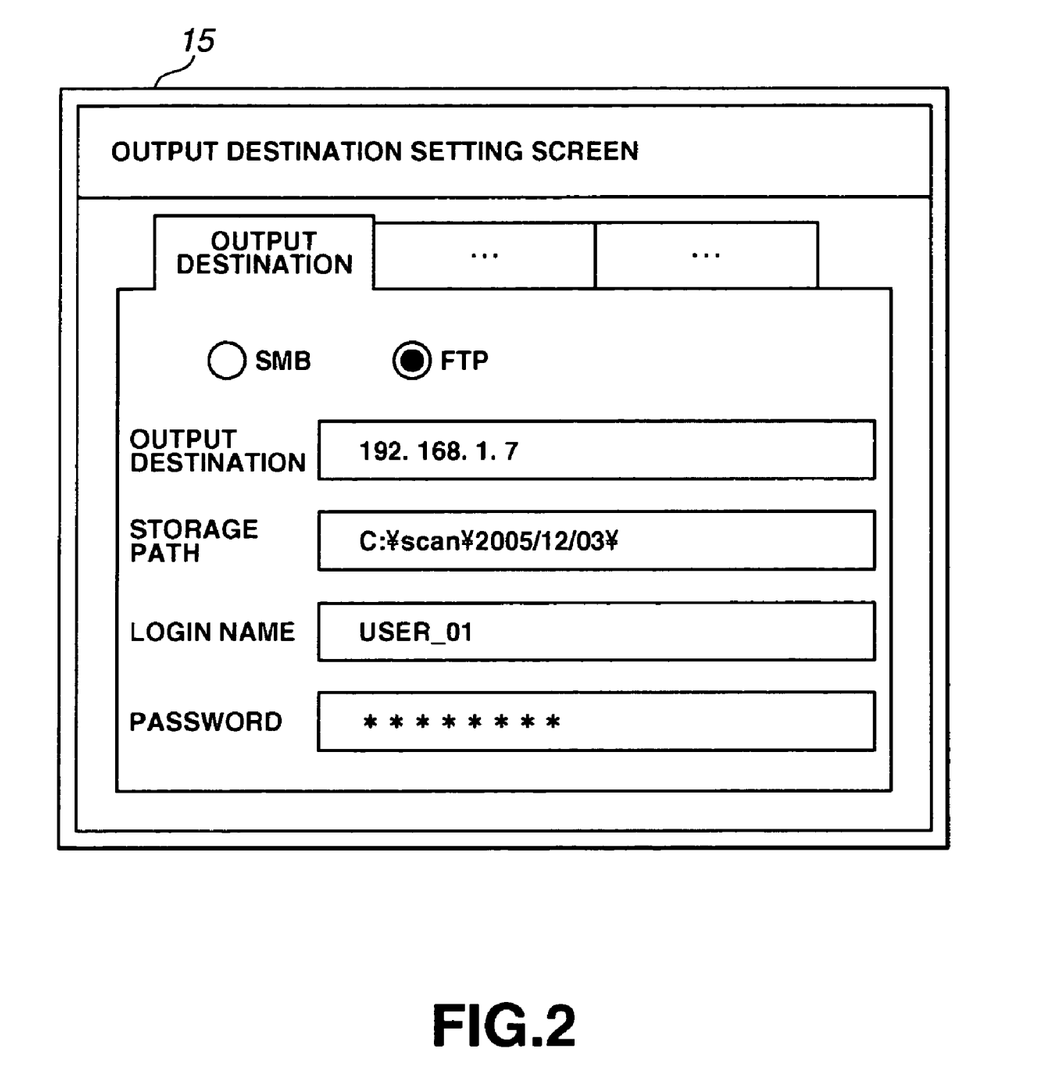
FIG. 2 is a diagram showing an example of a screen layout of an output destination setting screen.

A method of setting the output destination will be described with reference to FIG. 2. A user inputs output destination information for initialization of the scanner 10 from an output destination setting screen shown in FIG. 2. Specifically, the user inputs an IP address of the output destination terminal and its storage path and also inputs a login name and a password to be used to log into the output destination terminal. And, an enter button (not shown) indicating the completion of setting is hit to reflect the set contents and to terminate the setting.

Before reading image data from the original document, the scanner 10 accesses the output destination terminal (the computer 20 in this embodiment) determined by the output destination setting screen and performs authentication processing by using the predetermined login name and password. When the login is performed appropriately by the authentication processing, it is checked whether or not the predetermined storage path is on the pertinent terminal, and if yes, the reading of the original is started. And, the read image data is output to a prescribed folder or the like of the computer 20.

The functional structure of the scanner 10 will be described below.

The scanner 10 is comprised of a paper feed tray 11 in which original documents to be scanned are set, an image reading unit 12 which is comprised of an illumination lamp, a lens, a CCD (Charge Coupled Device) and the like and performs a scan processing of the original documents set in the paper feed tray 11 to read image data per line unit, a reading buffer 13 which is comprised of a RAM (Random Access Memory) or the like and temporarily accumulates the read image data, a controller 14 which is comprised of a CPU (Central Processing Unit), various types of ASICs (Application Specific Integrated Circuits) and the like and integrally controls the scanner 10, the display 15 which is a display device such as a liquid crystal display, the operation unit 16 which is an input device such as a touch panel, operation buttons and the like, and a communication unit 17 which is comprised of a network card and the like and realizes communication control between the scanner 10 and another device (the computer 20 or the like) by using an FTP (File Transfer Protocol) protocol, an SMB (Server Message Block) protocol and the like.

The paper feed tray 11 is provided with an automatic paper feeder 11a, and even when a plurality of original documents are set, the automatic paper feeder 11a sequentially feeds the original documents one at a time to convey to an unshown output tray via an unshown platen glass.

The image reading unit 12 reads image data by performing a scan processing of the original document being conveyed on the platen glass by the automatic paper feeder 11a. By repeating this processing, the original documents set in the paper feed tray 11 can be read continuously.

Figure 3:
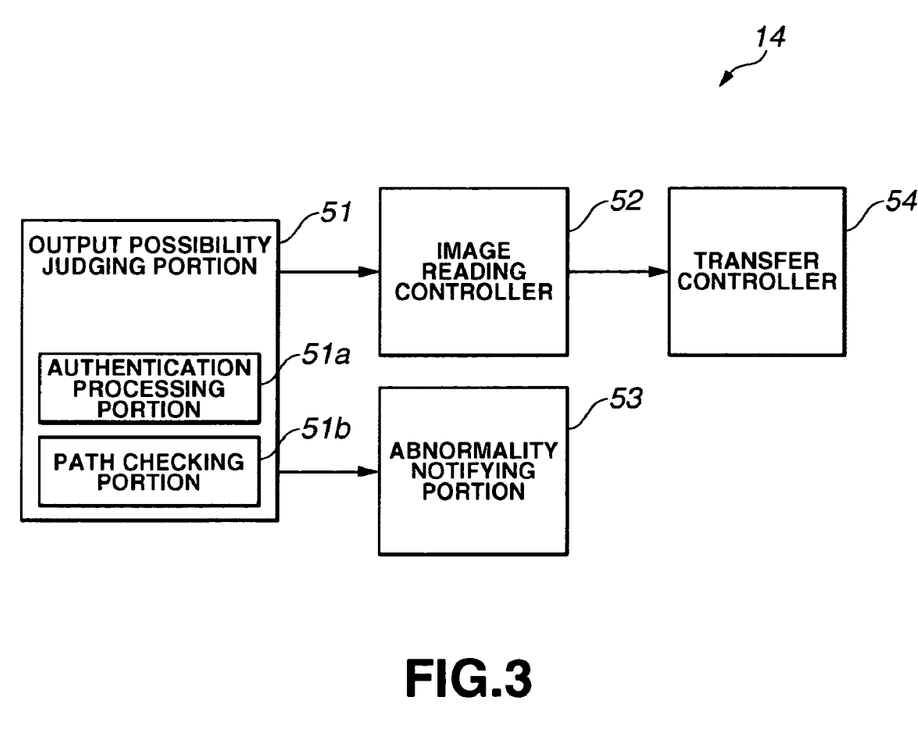
FIG. 3 is a diagram showing a part of a functional structure of a controller 14 shown in FIG. 1.

The functional structure of the controller 14 will be described in part with reference to FIG. 3.

The controller 14 is comprised of an output possibility judging portion 51, an image reading controller 52, an abnormality notifying portion 53, and a transfer controller 54 as various types of processing functional portions.

The output possibility judging portion 51 has a function to judge whether or not the image data can be output to the output destination terminals and is comprised of an authentication processing portion 51a and a path checking portion 51b.

The authentication processing portion 51a functions to log into the output destination terminal by performing an authentication processing by using the predetermined authentication information (login name, password).

The path checking portion 5b functions to judge whether or not the image data can be output to a predetermined storage path. More specifically, it is checked whether or not there is a region (e.g., a drive, a folder) set in the storage path in the output destination terminal into which the authentication processing portion 51a has logged.

It will be described in this exemplary embodiment that it is checked by the path checking portion 51b whether or not the predetermined storage path is present in order to judge whether or not it is possible to output to the storage path. But, in addition to the check whether or not the storage path is present, it may be configured to judge (access right) whether or not it is allowed to write image data into the storage path.

The output possibility judging portion 51 judges whether or not the image data can be output to the output destination terminal according to the result authenticated by the authentication processing portion 51a and the result of checking the storage path by the path checking portion 51b.

The image reading controller 52 has a function to control the original reading by controlling the operations of the automatic paper feeder 11a and the image reading unit 12, and the transfer controller 54 has a function to transfer (output) the image data read from the original document to the output destination terminal via the communication unit 17 and the network 40.

When it is judged by the output possibility judging portion 51 that the image data can be output to the output destination terminal, the image reading controller 52 starts to control the operation of the original reading process. It means that the original reading operation is started only after it is judged that the image data can be output to the output destination terminal. Thus, if the output is impossible, the original reading operation is not started (stopped), so that the user can easily notice the abnormality, and the user can easily grasp surely the abnormality when the image data cannot be output to the output destination terminal.

Figure 4:
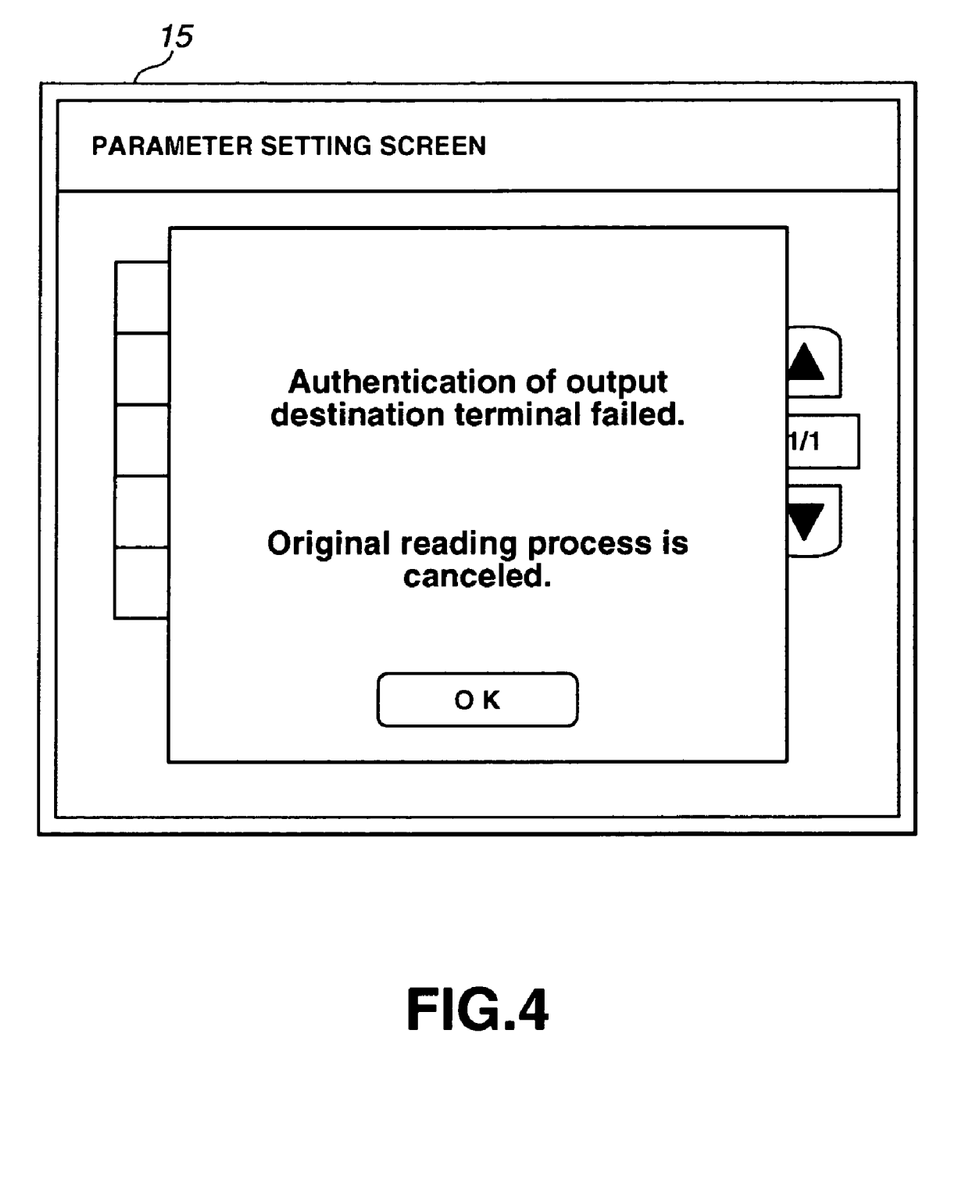
FIG. 4 is a diagram showing an example of a screen layout of an information screen informing a failure of authentication processing.

The abnormality notifying portion 53 has a function to show the occurrence of the abnormality on the display 15 to notify the abnormality to the user. At the same time, an alarm or the like may be sounded from an unshown loudspeaker. When it is judged by the output possibility judging portion 51 that the output of the image data to the output destination terminal is impossible, the abnormality notifying portion 53 notifies the occurrence of the abnormality to the user. For example, if the authentication processing fails, a popup window is activated as shown in FIG. 4 to display the occurrence of the failure of authentication and the cancellation of the original reading (reading job) because of the authentication failure. The functional blocks indicating the functional structure in part of the controller 14 are as described above.

The operation of the scanner 10 will be described with reference to FIG. 5 and FIG. 6.

Figure 5:
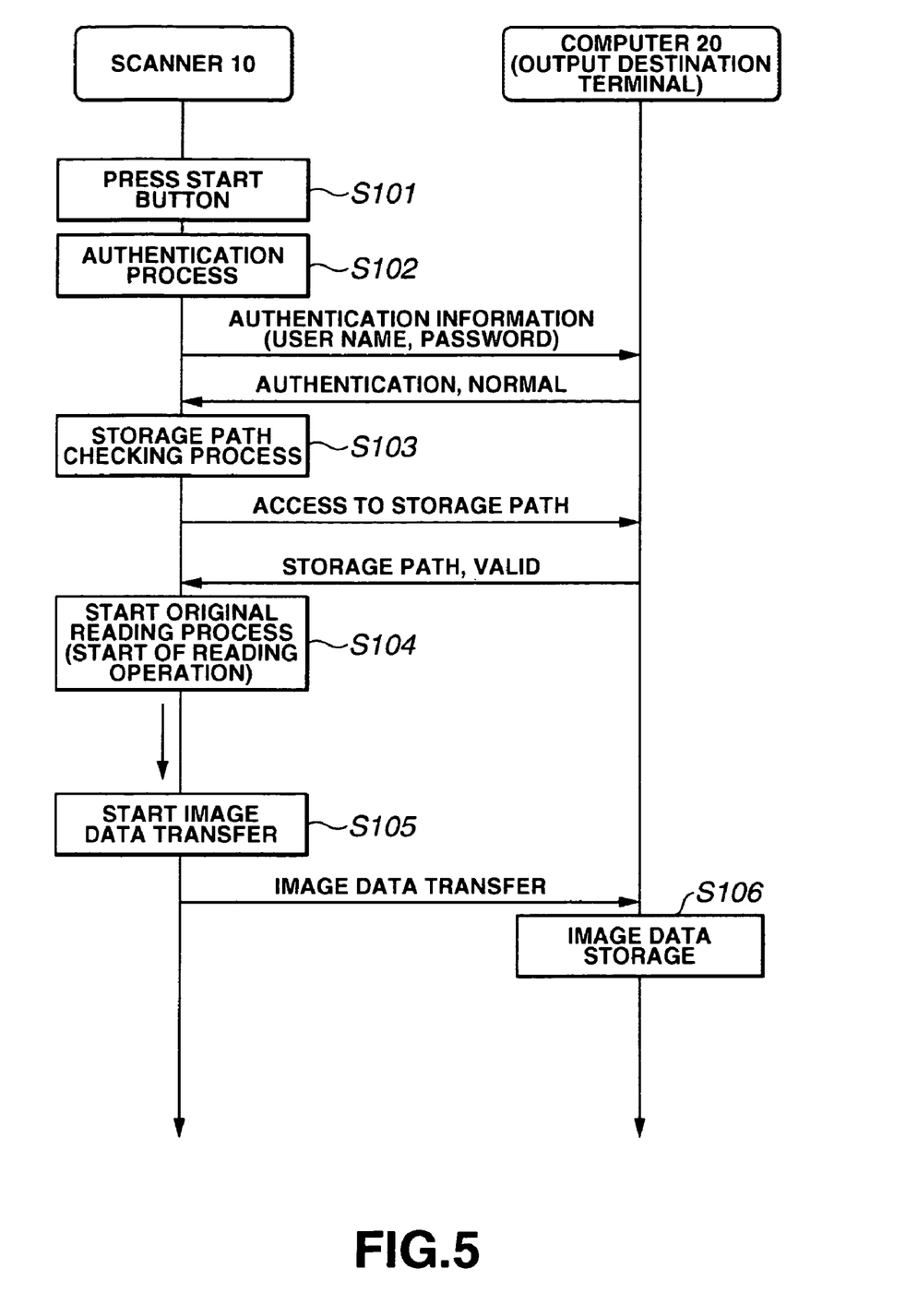
FIG. 5 is a sequence chart showing a flow of an original reading operation by the scanner 10 shown in FIG. 1.

FIG. 5 is a sequence chart showing a flow of an original reading operation. An operation (normal system) that the output to the output destination terminal (the computer 20) is performed normally is described below.

The user sets an original document to be scanned and presses the start button (step S101). The scanner 10 first performs an authentication processing of the computer 20 which is to be an output destination terminal (step S102).

When the authentication is performed normally and the login to the computer 20 is successive, it is checked whether or not the storage path is valid. In other words, it is judged whether or not there is a predetermined storage path (step S103).

When it is judged that there is a storage path and it is valid, a reading job is started, and image data is read from the original document (step S104). After the reading is completed, the image data is transferred to the computer 20 (step S105). It is stored in the computer 20, and the processing is terminated.

Figure 6:
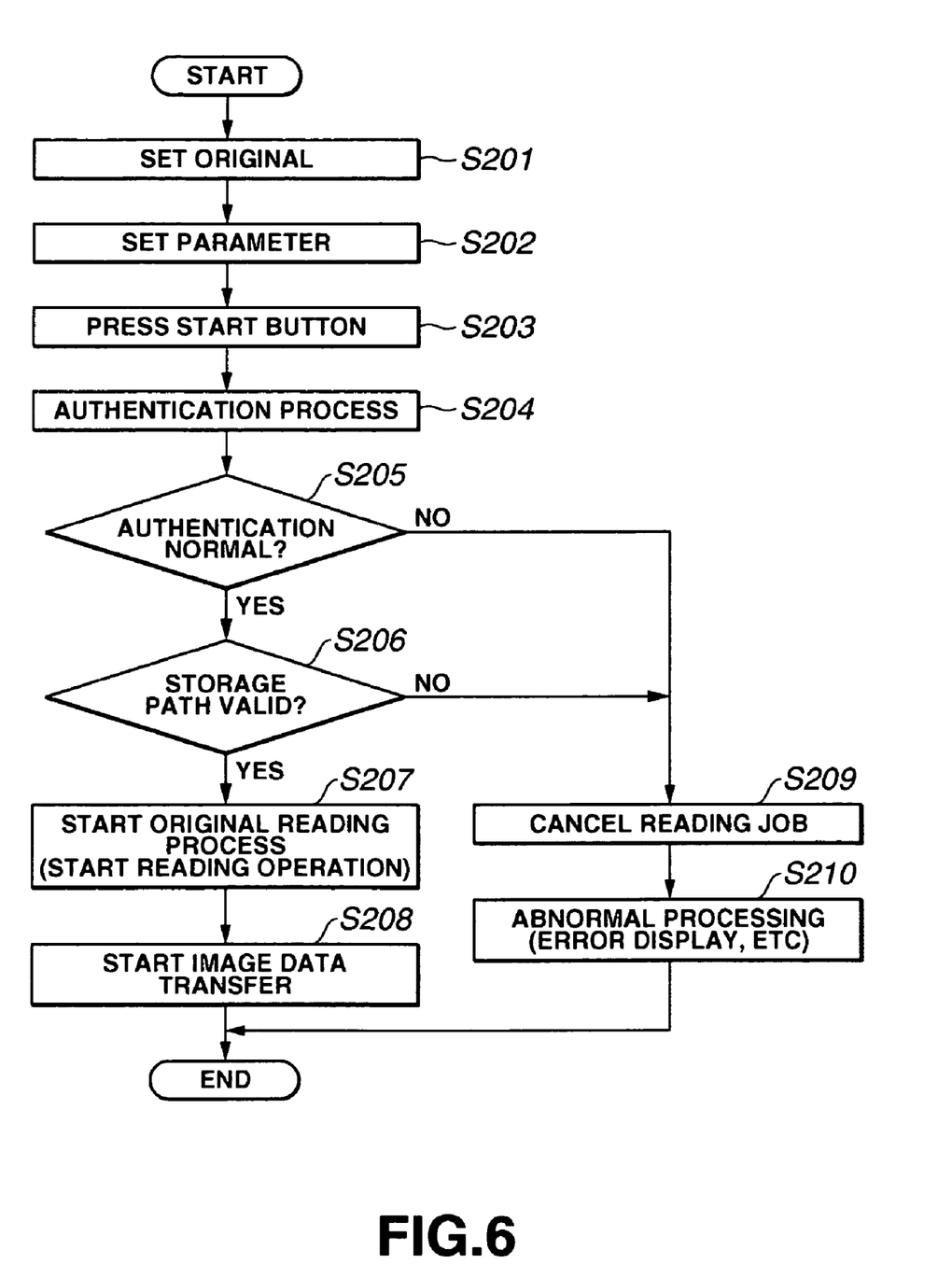
FIG. 6 is a sequence chart showing in detail the original reading operation by the scanner 10 shown in FIG. 1.

FIG. 6 is a flowchart showing in detail the original reading operation. The operation to perform the original reading process by means of the automatic paper feeder 11a will be described below.

The original reading process is started when the user sets a plurality of original documents in the paper feed tray 11 (step S201), sets an image editing parameter (step S202) and presses the start button (step S203).

When this process is started, the scanner 10 judges by the output possibility judging portion 51 whether or not it is possible to output the image data to the output destination terminal. According to this judging process, the authentication processing portion 51a first performs authentication of the output destination terminal (step S204). More specifically, the previously registered login name and password are used to log into the output destination terminal.

If the authentication processing fails because of incorrect authentication information or down of the computer (NO in step S205), the execution of a reading job is cancelled (step S209), the occurrence of the abnormality is displayed on the display 15 by the abnormality notifying portion 53 to inform the user of the abnormality (step S210), and this processing is terminated. Meanwhile, if the authentication processing is performed normally and the login to the output destination terminal is successive (YES in step S205), it is judged by the path checking portion 51b whether or not the storage path is valid. More specifically, the previously registered storage path is accessed to check whether or not there is the storage path, and it is judged whether or not the storage path is valid.

As a result, if there is not a destination folder or the like and it is judged that the storage path is invalid (NO in step S206), the execution of the reading job is cancelled (step S209), and the occurrence of the abnormality is displayed on the display 15 by the abnormality notifying portion 53 to inform the user of the abnormality (step S210), and this processing is terminated.

Meanwhile, if there is a destination folder and it is judged that the destination folder is valid (YES in step S206), the image reading controller 52 having been informed of the judgment starts to control the operations of the automatic paper feeder 11a and the image reading unit 12, and the original reading is started (step S207).

And, after the original reading is terminated, the transfer controller 54 transfers the image data read from the original document to the output destination terminal via the communication unit 17 and the network 40 (step S208), and after the transfer is completed, this processing is terminated.

As described above, an aspect of the present invention is configured to stop the original reading operation when it is judged impossible to output by judging whether or not the image data can be output to the output destination terminal when the original reading is performed in the push scan mode. Therefore, the user can easily find the occurrence of the abnormality because the original reading operation is stopped, and the abnormality that the output of the image data to the output destination terminal is impossible can be grasped by the user surely.

Thus, the present invention can remedy the following problem. If the abnormality occurred due to a failure of authentication or the like, the abnormality was conventionally noticed after the original reading process was completed. Therefore, the user had a tendency to mistake that the job had completed normally, and the user was misled.

It was described in the above exemplary embodiment that the original reading operation was started after it was judged whether or not image data could be output to the output destination terminal. But, the judging process and the original reading operation may be performed at the same time to stop the original reading operation when it is judged that the output is impossible. By doing so, the object of the invention to make the user to grasp the abnormality surely can be established, and the improvement of throughput is expected.

In the above exemplary embodiment, the authentication processing is performed on the output destination terminal (the computer 20), but when the invention is performed on the network where an authentication server is disposed to integrally control the authentication processing of a terminal on the network, the authentication processing of the authentication server is performed.

It was described in the above embodiment that the output destination terminal was the computer 20. But, it is not limited to the computer and may be any network device which can be an output destination terminal for a general network scanner.

It was also described in the above embodiment that it is judged whether or not it is possible to output to the output destination terminal by performing the authentication and the checking process of the storage path, but it may be judged whether or not the output can be made by performing only one of them. It can be changed appropriately depending on the terminal which is to be an output destination.

It was also described in the above embodiment that the image reading device of the invention was applied to the scanner 10. But, the invention can be applied to the image reading device in general such as a copy machine, a multifunctional device and the like having an image reading function.

The image reading device and its control method according to the invention can be applied to the image reading device in general which reads information (e.g., documents, photographs, figures and the like) by the scanning operation and converts it into image data and particularly can remedy the disadvantage that the user was misled into believing that the original reading operation was completed although the output to the output destination terminal was impossible.

The foregoing description of the exemplary embodiment of the present invention has been provided for the purpose of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling other skilled in the art to understand the invention for various embodiments and with the various modifications as are suited to the particular use contemplated. It is intended that the scope of the invention be defined by the following claims and their equivalents.

The entire disclosure of Japanese Patent Application No. 2005-340564 filed on Nov. 25, 2005 including specification, claims, drawings and abstract is incorporated herein by reference in its entirety.

What is claimed is:

1. An image reading device which performs an original reading process in a push scan mode in which image data read from an original document is output to an output destination terminal through a network, comprising:
    an image reading unit that reads image data from the original document;
    an automatic paper feeder that feeds a plurality of set original documents including the original document sequentially one at a time to the image reading unit;
    an image reading control unit that controls reading of the image data, by the image reading unit, of the original document fed by the automatic paper feeder, by controlling the automatic paper feeder and the image reading unit; and
    a judging unit that tries to log-in to the output destination terminal by using predetermined authentication information corresponding to the output destination terminal concurrently with a start of feeding of the original document by the automatic paper feeder controlled by the image reading control unit, and that judges from a result of the log-in whether or not the image data can be output to the output destination terminal, wherein
    the judging unit comprises a path checking portion that judges whether or not there is a storage path in the output destination terminal when the log-in is successful, and judges that the image data can be output to the output destination terminal when it is judged by the path checking portion that there is the storage path in the output destination terminal,
    the image reading control unit cancels the ongoing original reading process when it is judged by the judging unit that it is impossible to output the image data to the output destination terminal, and
    the image reading control unit continues the ongoing original reading process when it is judged by the judging unit that it is possible to output the image data to the output destination terminal.

2. The image reading device according to claim 1, further comprising a failure information unit, wherein
    the judging unit judges that it is impossible to output the image data to the output destination terminal when the log-in is not successful, and
    the failure information unit informs of a failure when the judging unit judges that it is impossible to output the image data to the output destination terminal.

3. The image reading device according to claim 1, further comprising a failure information unit, wherein
    the judging unit judges that it is impossible to output the image data to the output destination terminal when the path checking portion judges that the storage path is not in the output destination terminal, and
    the failure information unit informs of a failure when the judging unit judges that it is impossible to output the image data to the output destination terminal.

4. The image reading device according to claim 1, wherein:
    the judging unit further comprises a path checking portion which checks, when the log-in to the output destination terminal is authenticated, whether or not a storage path where the image data is to be stored is present or not in the output destination terminal,
    the judging unit judges, when the log-in to the output destination terminal is not authenticated, or the path checking portion does not check whether or not the storage path is present in the output destination terminal, the output of the image data to the output destination terminal is impossible.

5. The image reading device according to claim 4, wherein:
    the judging unit further comprises an access checking portion which checks, when it is checked by the path checking portion that the storage path is present in the output destination terminal, whether or not it is allowed to write image data into the storage path, and
    the judging unit judges, when it is checked by the access checking portion that it is not allowed to write image data into the storage path, the output of the image data to the output destination terminal is impossible.

6. The image reading device according to claim 5, further comprising an abnormality notifying portion that notifies, when the judging unit judges that the output of the image data to the output destination terminal is impossible, an abnormality to that effect.

7. A control method of an image reading device which performs an original reading processing in a push scan mode in which image data read from an original document is output to an output destination terminal through a network, comprising:
    starting the process of feeding a plurality of set original documents including the original document sequentially one at a time to an image reading unit by an automatic paper feeding unit and the process of reading image data, by the image reading unit, of the fed original document upon a start instruction of the original reading process to read the image data from the original document,
    trying to log-in to the output destination terminal by using predetermined authentication information corresponding to the output destination terminal to log into the output destination terminal concurrently with a start of the feeding of the original document by the automatic paper feeder,
    judging by a judging unit from a result of the log-in, whether or not it is possible to output the image data to the output destination terminal, wherein
    the judging unit comprises judging whether or not there is a storage path in the output destination terminal when the log-in is successful, and judging that the image data can be output to the output destination terminal when it is judged that there is the storage path in the output destination terminal;
    canceling by an image reading control unit the ongoing original reading processing when it is judged by the judging unit that it is impossible to output the image data to the output destination terminal; and
    continuing the ongoing original reading process when it is judged by the judging unit that it is possible to output the image data to the output destination terminal.

8. An image reading device which performs an original reading process in a push scan mode in which image data read from an original document is output to an output destination terminal through a network, comprising:
    an image reading unit that, upon a start instruction of the original reading process, starts scanning the original document and reads image data of the original document,
    a log-in checking portion that tries to log-in to the output destination terminal by using predetermined authentication information corresponding to the output destination terminal to log into the output destination terminal concurrently with a start of scanning operation by the image reading unit, and checks whether or not the log-in is authenticated;
    a path checking portion that checks, when the log-in checking portion checks the log-in is authenticated, whether or not the storage path where the image data is to be stored is present or not in the output destination terminal;

an access checking portion that checks, when the path checking portion checks that the storage path is present in the output destination terminal, whether or not it is allowed to write image data into the storage path, and a judging unit that judges, when any one of the checking results by the log-in checking portion, the path checking portion and the access checking portions is negative, that it is impossible to output the image data to the output destination terminal; and an image reading control unit that cancels the original reading process by the scanning operation of the image reading unit when the judging unit judges that it is impossible to output the image data to the output destination terminal.

9. A control method of an image reading device which performs an original reading process in a push scan mode in which image data read from an original document is output to an output destination terminal through a network, comprising:

starting, upon a start instruction of the original reading process, scanning the original document and reading, by an image reading unit, image data of the original documents;

trying to log-in to the output destination terminal by using predetermined authentication information corresponding to the output destination terminal to log into the output destination terminal concurrently with a start of scanning operation by the image reading unit, and checking, by the log-in checking portion, whether or not the log-in is authenticated;

checking by a path checking portion, when the log-in checking portion checks the log-in is authenticated, whether or not the storage path where the image data is to be stored is present in the output destination terminal;

checking by an access checking portion, when the path checking portion checks that the storage path is present in the output destination terminal, whether or not it is allowed to write image data into the storage path;

judging by a judging unit, when any one of the checking results by the log-in checking portion, the path checking portion and the access checking portions is negative, that it is impossible to output the image data to the output destination terminal; and canceling, by an image reading control unit, the original reading process by the scanning operation of the image reading unit when the judging unit judges that it is impossible to output the image data to the output destination terminal.

* * * * *